March 14, 1933.  J. C. RAH  1,901,667
CABLE TERMINATOR
Filed Dec. 6, 1930
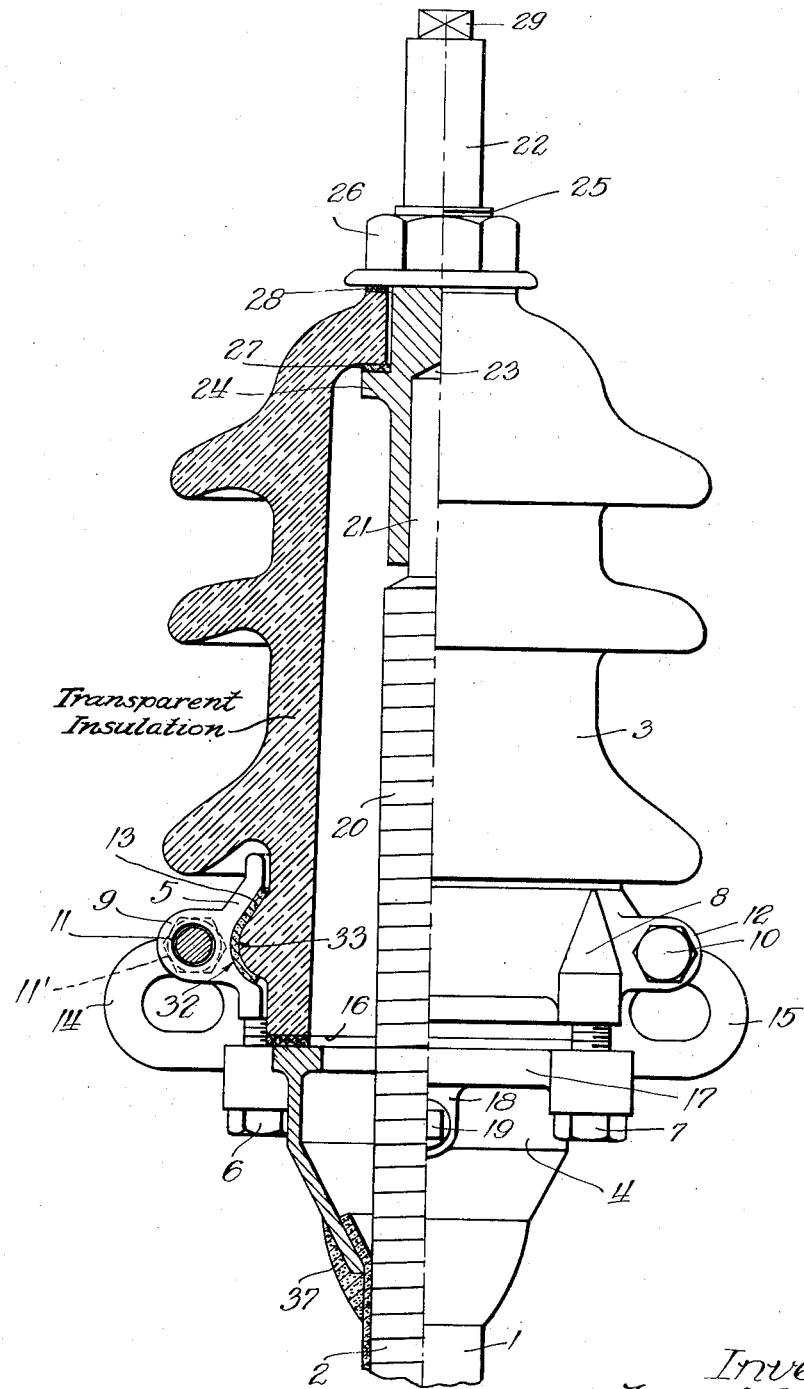
Inventor.
Joseph C. Rah.
By
Atty's Patented Mar. 14, 1933

1,901,667

UNITED STATES PATENT OFFICE

JOSEPH C. RAH, OF CHICAGO, ILLINOIS, ASSIGNOR TO THE DELTA STAR ELECTRIC COMPANY, OF CHICAGO, ILLINOIS, A CORPORATION OF ILLINOIS

CABLE TERMINATOR

Application filed December 6, 1930. Serial No. 500,455.

This application is a continuation in part of my copending application Serial No. 426,814, filed February 8, 1930.

The present invention relates to cable terminators, and has more particularly to do with a novel and improved oil-tight terminator which is simple in construction and presents several novel features.

The name "cable terminator" as used in this specification and in the appended claims, refers to a device for receiving the terminating end of a cable, having terminal provisions for joining the conductor of the cable to a bus bar or to other current conducting or distributing provisions maintained in the locality in which the cable terminates. Such a cable terminator is frequently also referred to as pothead or end bell. However, I prefer to apply the name—cable terminator—to the device because it expresses more accurately the nature of the device and its function.

Such a terminator device consists, in one embodiment, of a hollow insulating casing for receiving the end of a terminating cable, with provisions for attaching the same securely in the interior of the casing, and with terminal means exteriorly projecting from the casing and in conductive relation with the cable conductor for establishing connection between the conductor and the bus bar. There are also means such as clamps, provided for mounting the insulating casing of the terminator on a rack, or other suitable mounting equipment located in the proximity of the terminator. It may be stated at this point that the mounting clamps mentioned above are, in prior constructions, usually attached permanently to the insulating casing, by means of cementing or the like, providing a rigid structure for the assembly which does not readily yield to strains and stresses imposed upon the structure under ordinary conditions. Breakage of the insulator body is, therefore, easily possible.

Various problems arise in connection with the design and manufacture of such terminators. The power transmitted over a cable demands safe and dependable equipment at the terminating end which must be of sturdy construction. The terminator must be oiltight and must provide for good insulation. The entire assembly and each part thereof must be easily accessible. The structure of the assembly must be such as to adapt itself readily to strains and stresses imposed upon the same under ordinary conditions without causing damage to the insulating casing of the terminator or to other parts. There should be provisions to prevent the effect of induction and, therefore, of power loss, by employing suitable material for the various parts of the terminator. An attempt must also be made to keep the manufacturing cost low, that is to say, a device must be rendered which combines the virtues of a first class product with the advantages of relatively low cost.

However, it is not only the low initial cost of the device itself which must be kept in mind by the engineer and by the manufacturer attempting to answer the requirements of service. The device must also be designed with a view to the further problems connected with the installation and maintenance, items which vitally affect every power installation. The terminator must, therefore, also show all the features demanded and appreciated by the installer and by the maintenance force, that is to say, it must be of such construction as to warrant ease in installation and absolute safety and reliability in operation.

It will be understood that an attempt to meet all the points enumerated above and other points yet to be discussed will present difficulties. Many types of terminators are known, all having their peculiar advantages, but no type has heretofore been disclosed which fully and satisfactorily answers the requirements generally intimated in the previous paragraphs.

I have discussed above only those requirements of service which suggest themselves palpably to those experienced in the art. Now, when the problem of cable terminators and the like is viewed more critically, it will appear that there are yet certain additional problems which are of vital importance but which cannot be solved by purely structural provisions.

For example, there is the problem of visibility of the insulating fluid or compound within the terminator. It is desirable that means be provided in connection with such a terminator for exposing to view the interior of the terminator in order to detect the loss of insulating fluid before damage is done to the equipment. It has been attempted in the past to solve this problem by providing an additional chamber or indicator in conjunction with a terminator of this character which is made of transparent material and serves as an indicator for the insulating fluid.

Such an indicator usually takes the form of a glass tube arranged parallel to the insulating casing of the terminator and in communication therewith. The diameter of the tube is relatively small and must be small in comparison with the size of the insulating casing due to other considerations. The oil attaches to the inner walls of this tube and forms a film which obstructs the indication and makes it difficult to recognize the oil level. The oil rises within the cable and changes the oil level in the insulator casing accordingly. This fluctuation of the oil level is called—breathing—and is due to the heating effect responsive to varying loads. The ordinary indicator, due to the accumulated film of oil on the walls of the glass tube, and due to the small size of the column of oil in the glass tube (the film of oil on the walls of the glass tube causes a non-uniform restriction of the oil column), does not indicate these fluctuations in response to the breathing effect and may indicate a lowering of the level when it is too late. The very purpose of the indicator is therefore defeated.

The faults of the tube indicator have been recognized, and various other structures have been developed in the past. For example, a transparent relatively large chamber may be used in conjunction with the insulating casing to indicate the oil level therein. However, a workable device of this type presents other difficulties and increases the cost of the terminator.

Another problem has particularly to do with means for detecting faulty insulators. The insulators, as is well known, consist of a tubular body usually made of porcelain which is glazed on the outside. It happens frequently that a cracked insulator is put in service. When this is the case, service trouble will be encountered and loss will be occasioned by removing the faulty insulator and replacing the same by a new insulator. There are, so far, no means for detecting a fault of this character before putting the insulator to service. A crack may, of course, also develop during service. Discovery of such a faulty insulator during service is of vital importance. However, as in the last mentioned case, there is no reliable means for indicating a crack in the insulator body during service of the insulator.

The insulator, which is usually of porcelain, glazed on the outside, as was mentioned above, cannot be filled with hot compound. The porcelain would crack if it were attempted to fill the insulator with hot compound. In case of a flash-over, the skirts of an ordinary porcelain insulator will crack and break off.

A further problem appears in connection with porcelain insulators, particularly of the type provided with a glaze made of iron or any other metallic oxide. When such an insulator is used in a locality which produces a pollution of air with metallic particles, as is the case in steel mills, ore mines and the like, it will happen invariably that the metallic particles in the air will combine with the metallic oxide of the glazed porcelain insulator and firmly adhere to it. The insulating value of the insulator is thereby altered and it is therefore necessary that the metallic particles be removed from time to time from the surface of the porcelain insulator. This is done by rubbing the insulator surface with emery cloth or the like. The result is that not only the metallic particles are removed from the surface of the glazed insulator, but the glaze itself is also removed. The porcelain is thereby exposed to the atmosphere and absorbs moisture, whereby the insulating value of the insulator is reduced. It is therefore frequently necessary to remove such an insulator with reduced insulating value. Trouble may be caused prior to its replacement.

I have observed the above and other problems in practice and have conceived the idea of devising a terminator of the class defined previously which meets the most critical requirements of service and maintenance and which will be appreciated by those experienced in the art as a distinct advantage and novelty over known devices of this type.

Accordingly, the aim of the invention is to furnish a terminator of safe and dependable structure which is characterized by simplicity of design, by ease in installation and by general reliability.

In addition to structural objects and features, which will be brought out as the specification progresses, it is one of the chief objects of the present case to provide an insulator having an insulating body made of transparent material in order to provide for visibility of the insulating fluid or compound within the terminator.

Another object relates to a terminator of this type using an insulating casing made of pyrex glass instead of the glazed porcelain ordinarily provided.

Pyrex glass, as is well known, has certain distinguishing properties and I have conceived the idea of availing myself of these properties in connection with a terminator in order to solve several problems intimated above. Due to the low coefficient of expansion which is one of the properties of pyrex glass, it is possible to fill the terminator with hot insulating compound, thereby providing one desirable feature which heretofore has not received a satisfactory solution. The low coefficient of expansion of pyrex glass reduces also the possibility of breakage due to flash-over. During a flash-over the insulator surface is subjected to local heating whereby the skirts of the ordinary porcelain insulator break off. In case of the pyrex insulating body which I employ in connection with my terminator, the danger of breakage is reduced. In case of a flash-over, the only thing that is liable to happen will be a melting off of a portion of the skirts of the insulating body. This evidently produces only an indentation and not a crack in the insulating casing. Accordingly, no critical situation is brought about due to such a flash-over, as was previously the case when porcelain insulators were employed.

The insulating fluid or compound within the terminator will be visible to the outside, indicating to the maintenance force at any time the condition of the insulating fluid or compound within the terminator without any auxiliary devices. Therefore, the use of pyrex glass for the insulating body or casing renders an additional advantage and permits to dispense with auxiliary devices thereby reducing the manufacturing costs of the device.

Cracks in the insulator body will be detected before assembling the same with a terminator, and cracks, should they occur during service, will be easily detected.

As a further advantage which results from the use of the pyrex insulating casing may be listed the possibility of testing the insulating characteristics of the insulator by means of X-rays.

Finally, an important advantage is secured when the terminator having such a pyrex insulating casing is employed in an area the atmosphere of which is polluted more or less with metallic particles as is the case in ore mines or steel mills, and the like. Metallic particles in the air will not adhere to the surface of the insulator, that is to say, they may settle on the insulator surface in the form of dust which may be easily removed, but they will not combine with the material of the insulator as it happens in case of porcelain insulators glazed with metallic oxide. The dust may be easily removed. Rubbing off of the particles by means of emery cloth as is necessary in case of porcelain insulators is obviated.

The above and other advantages are secured by my invention and several other novel features are incorporated which will be brought out as the description progresses.

The invention will now be described in detail, with reference to the single sheet of drawing forming part of this specification and showing one way of realizing the invention in practice.

The drawing shows a cable terminator, with a cable entering at one end, and terminal provisions projecting from the other end thereof and in conductive relation with the conductor of the cable for completing the connection with a current conducting body which may be a bus bar or the like.

Referring now to the drawing, reference numeral 1 designates the end of a terminating cable having a lead sheath 2. The stripped end 20 of the cable is inserted into the interior of the insulating casing 3, through a so-called wiping sleeve 4 which is fastened to a clamp body 5 by means of bolts such as 6 and 7. The tubular insulating casing 3 is made, in accordance with my invention, of pyrex glass. Enclosed between the flange 17 of the wiping sleeve 4 and the insulating casing 3 is a gasket 16 for the purpose of sealing this joint oil-tight. The bolts 6 and 7 enter threaded holes provided in extensions, such as 8, protruding from the clamp body 5 at suitable points on its periphery.

The clamp 5 may be constructed in the manner of a split or sectional ring having several sections which embrace the insulating body 3 and are held together by bolts such as 10 entering holes 11 provided in the extensions 9 and 12 which project peripherally from the several sections of the clamp 5. The bolt projecting through the extension 9 on the left side of the drawing is shown in cross section and a nut such as 11′ may be provided for holding the bolt. The nut 11′ is shown in dotted lines. A layer of lead or another suitable substance may be interposed between the clamp 5 and the insulating casing 3 as is indicated at 13 to provide a cushion effect which insures a firm grip of the clamp on the insulating body 3, at the same time preventing breakage because the joint is yieldable and will permit the assembly to readjust itself.

This will be particularly apparent when considering the rounded protuberance 33 extending peripherally and circularly around the insulating casing and engaged by the sections of the clamp which conform to the shape of the protuberance 33 as is indicated at 32. It will be clear that any strain or stress exerted on the cable 1 will be transmitted to the clamp 5 over the wiping sleeve 4 which is attached to it, and that a readjustment of the clamp 5 on the insulating casing 3 will take place without damage to any part of the terminator and without detriment to its functions.

Numerals 14 and 15 indicate portions of a bracket for attaching the terminator to a rack or to other mounting provisions. The attachment may be made by directly fastening the clamp 5 to the bracket by means of suitable bolts. The provision is simple and need not be explained in detail. As to the material employed, it may be mentioned at this point that the clamp 5 may be made of an alloy consisting of bronze and iron to equal parts, while the brackets 14 and 15 may be ordinary iron brackets. It was found that these materials, used as indicated, give the best results mechanically and also electrically. It is understood, that the materials given above are given merely by way of example. Any other suitable material may be employed.

The end of the wiping sleeve for embracing the lead sheath 2 of the cable may be attached to the same by hammering, rolling or pressing (when employing a sleeve having a lead skirt) and the joint is sealed oil-tight by the provision of a lead sleeve 37 added exteriorly as shown. It is, of course, understood that the entire wiping sleeve may be a rigid metal body of standard design. No hammering, rolling or pressing is necessary in such a case; the sleeve is simply attached as shown in the drawing, and the lead sleeve such as 37 is applied exteriorly for the purpose of sealing.

Reference numeral 18 indicates a projection on the wiping sleeve, below its flange 17 which is provided with a threaded hole for filling insulating fluid into the interior of the terminator. A plug 19 serves for closing this opening.

It will be apparent that the end of the lead sheath 2 of the cable 1 extends into the interior of the terminator only slightly beyond the closing edge of the wiping sleeve. The remainder 20 of the cable is stripped, exposing the insulating tape and the cable thus insulated rises within the terminator to the point where conductive relation is to be established with the conductor 21 of the cable. The insulation 20 is removed from the conductor 21 at this point, and a rigid stud 22 provided with an opening 23 is attached to the conductor 21 by inserting the same into the opening 23 as shown. The diameter of the opening 23 is a trifle smaller than the diameter of the cable conductor 21 to insure a tight fit.

The stud 22 is also provided with a collar or shoulder 24 which serves as a seat for the insulator casing 3, and with an exteriorly threaded portion 25 for attaching a nut 26. The assembly is closed and sealed oil-tight by inserting gaskets 27 and 28 between the shoulder 24 and the insulating casing 3, and between the insulator casing 3 and the flanged nut 26, respectively. It will be understood that the gasket 28 may be an ordinary washer.

The upper portion 29 of the terminal stud 22 may be squared or may be provided with a hole or with other suitable means for holding the stud against turning when the nut 26 is tightened to seal the assembly. The connection to the bus bar or to other current conducting or distributing equipment may be completed by connecting the terminal stud 22 with the bus bar by means of a suitable clamp.

In case inspection of the interior of the terminator is required, it is merely necessary to remove the flanged nut 26 and, after removing the clamp 5 from the casing 3, the same may be lifted off for carrying out the desired inspection or other work. This procedure is simple and efficient.

The structure, as above described, is extremely simple. There are no parts which can get out of order under ordinary conditions of operation and wear. All parts are easily accessible and the assembly of the terminator is simplified since there is only one cap nut which has to be tightened for closing and for sealing the device oil-tight, or for opening the device for inspection.

Now, as to the terminator casing designated by numeral 3, it will be observed that the inner diameter of the casing is not shown to be cylindrical but that the diameter is larger at the lower end of the casing 3. The purpose of this gradually widening inner diameter of the insulating casing 3 will be readily appreciated. As shown, the casing or moulding process will be simplified. It is, of course, also possible to make the inner diameter of the casing 3 exactly cylindrical if it is desired or required for some purpose. The upper end of the casing 3 which is in contact with the gasket 28 will be preferably ground flat and true so that a good seat for the gasket 28 is provided. I have shown the insulating casing 3 provided with three skirts. It will be understood, of course, that more or less skirts may be provided as desired. Likewise, the exact structure and proportions of the casing may be changed or modified to suit electrical and other conditions. The entire insulating casing 3 is made preferably of pyrex glass or of a substance having similar properties. Pyrex glass is commercially available and the insulator 3 for the terminator as shown may be readily manufactured. The advantages secured by the use of the glass insulator in place of the ordinary glazed porcelain insulator have been listed previously but will be briefly enumerated below in order to keep the salient points of advantage in mind.

The use of the insulating body made of the material described renders visibility of the insulating fluid or compound in the interior of the terminator, eliminating special provisions for checking the contents of the terminator. The terminator may be filled with hot compound, which is an advantage not obtained by the use of porcelain insulators. Cracks in the insulating casing may easily be detected before and during the service. The insulating substance being pyrex glass which has a better thermal characteristic than porcelain permits local heating of the terminator without any danger. This is an important advantage particularly in case of flash-over which, in the severest case, may melt off a portion of the skirts but which will not cause breakage. The insulator may be inspected prior to assembly by means of X-rays whereby the insulating characteristics of the individual insulator may easily be established. A terminator employing such a pyrex insulating casing, as described, when used in an ore mine or in steel mills and the like will not suffer from the metallic particles contained in the atmosphere.

The above and other previously noted advantages are secured by my invention. What I consider new and desire to have protected by Letters Patent is pointed out in the following claims.

I claim as my invention:—

1. In a cable terminator, a hollow insulator comprising a unitary piece of transparent glass of high dielectric strength and impervious to moisture and open at both ends and having a flat seating surface and adjacent said surface but spaced therefrom a peripheral bead formed integrally with the body of the insulator and having a continuously curved surface merging with the body of the insulator in continuous curves free of sharp corners both above and below the bead, a clamp surrounding said bead and having an internal curvature mating with the curvature of said bead but of a larger diameter whereby the clamp is permitted a limited degree of angular adjustment longitudinally of the insulator, and a gasket between the clamp and the bead.

2. The combination with a metallic sheathed cable, an oil filled terminator comprising a tubular sleeve of a diameter substantially greater than the cable diameter and having one end connected to the sheath and provided with a mounting flange at its opposite end, a sealing gasket on said flange, the insulated cable conductor extending through said sleeve and being bared at its outer end, a terminal fitting over the end of the conductor and provided with a shoulder intermediate its ends, a hollow insulator fitted over the end of the conductor and resting upon said shoulder and forming a liquid tight seal therewith, said insulator extending towards the flange on the sleeve and at its opposite end resting also on the gasket on said flange, the adjacent end of the insulator being provided with a peripheral bead spaced from the supporting flange and having a continuous curvature free of sharp corners in longitudinal section, a clamp embracing said bead and having a complementary internal curvature to permit a limited degree of longitudinal angular adjustment of the clamp, screw means securing the flange on the sleeve to the clamp, and a filling of insulating oil in said terminator, the material of which the insulator is made comprising transparent glass to permit external visual observation of the quantity and degree of contamination of the oil, and the degree of contamination of the inside wall of the insulator.

3. In a device for establishing a cable connection, a joining sleeve having a peripheral flange at one end, a hollow insulator open at both ends and having at one end a flat seating surface seating on said flange, and having adjacent said seating surface but spaced therefrom an integrally formed peripheral bead merging with the body of the insulator in continuous curves free of sharp corners both above and below the bead, a split clamp surrounding said bead and of an internal curvature mating with the curvature of the bead, whereby the clamp is permitted a limited degree of angular adjustment longitudinally of the insulator along the upper and lower continuously curved surfaces merging the bead with the body of the insulator, and means securing the clamp to the flange of the sleeve.

4. In a device for establishing a cable connection, a hollow insulator open at both ends and having adjacent one end but spaced therefrom an integrally formed peripheral bead merging with the body of the insulator in continuous curves free of sharp corners both above and below the bead, a split clamp surrounding the bead and of an internal curvature mating with the curvature of the bead and embracing the upper and lower continuously curved surfaces thereof whereby the clamp is permitted a limited degree of angular adjustment longitudinally of the insulator along the upper and lower continuously curved surfaces merging the bead with the body of the insulator.

In witness whereof, I hereunto subscribe my name this 2nd day of December, 1930.

JOSEPH C. RAH.